United States Patent [19]

Jernigan

[11] 4,367,154

[45] Jan. 4, 1983

[54] GLYCOL COMPOSITIONS CONTAINING A PHOSPHOROUS-MODIFIED SILANE

[75] Inventor: Robert T. Jernigan, Lake Jackson, Tex.

[73] Assignee: The Dow Chemical Company, Midland, Mich.

[21] Appl. No.: 288,090

[22] Filed: Jul. 29, 1981

[51] Int. Cl.$^3$ .............................................. C09K 5/00
[52] U.S. Cl. ................... 252/78.3; 556/404; 556/405
[58] Field of Search ............... 556/404, 405; 252/78.3

[56] References Cited

U.S. PATENT DOCUMENTS

| | | | |
|---|---|---|---|
| 3,121,692 | 2/1964 | Morehouse et al. | 252/75 |
| 3,234,144 | 2/1966 | Morehouse | 252/389 |
| 3,248,329 | 4/1966 | Pines et al. | 252/78 |
| 3,282,846 | 11/1966 | Scott | 252/75 |
| 3,312,622 | 4/1967 | Pines et al. | 252/75 |
| 3,337,496 | 8/1967 | Pines et al. | 260/46.5 |
| 3,341,469 | 9/1967 | Pines et al. | 252/389 |
| 3,362,910 | 1/1968 | Ordelt et al. | 252/75 |
| 4,093,641 | 6/1978 | Plaeddemann | 556/405 |
| 4,149,985 | 4/1979 | Wilson | 252/7 X |

FOREIGN PATENT DOCUMENTS 2018266 10/1979 United Kingdom .

*Primary Examiner*—Michael R. Lusignan
*Attorney, Agent, or Firm*—B. G. Colley

[57] ABSTRACT

Glycol concentrates containing alkali metal silicates are rendered gellation resistant by the addition of phosphonates having one of the formulas, (I)  $(RO)_{3-m}(R')_m Si—R^2—O—P(O)(OR^3)(R^4)$, (II)  $[(RO)_{3-m}(R')_m Si—R^2—O]_2 P(O)(R^4)$ or (III) mixtures of I and II, wherein m is 0–2

R, $R^3$, $R^4$ are alkyl groups of 1–4 carbons,

R' is an alkyl group of 1–4 carbons, phenyl, and aralkyl group of 7–10 carbons, and $R^2$ is an alkylene group of 1–4 carbons.

33 Claims, No Drawings

GLYCOL COMPOSITIONS CONTAINING A PHOSPHOROUS-MODIFIED SILANE

BACKGROUND OF THE INVENTION

The present invention provides a gellation resistant aqueous glycol or glycol ether composition containing a phosphorous modified silane.

Antifreeze compositions containing glycols and various corrosion inhibitors are well known in the prior art as is illustrated by U.S. Pat. Nos. 3,282,846 dated Nov. 1, 1966, and 3,362,910 dated Jan. 9, 1968. The use of the relatively inexpensive and effective borax and silicates in glycol formulations is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or a store. The end user, when he attempted to pour the glycol concentrate into his automotive radiator found that the concentrate had developed "slugs" or gels which either did not pour readily or which tumbled out in discrete masses along with the liquid. The present invention was developed to eliminate this gel formation.

In U.S. Pat. No. 4,149,985 dated Apr. 17, 1979, there is disclosed that a gellation resistant glycol composition containing borate and silicate additives can be made wherein the order of addition of the additives and the pH of the solution is closely controlled in order to obtain the gellation resistant formulation. This is difficult to control during production.

In Ser. No. 191,798 filed Sept. 29, 1980 now U.S. Pat. No. 4,287,077 dated Sept. 1, 1981, there is disclosed a gellation resistant glycol composition which contains an effective amount of a silicone containing polyoxyalkylene functionality. While these silicone compounds are effective, it has been found that production of glycol compositions containing these compounds is limited to the addition of the compounds before the addition of the alkali metal silicates which are present in the glycol compositions to enhance the corrosion resistance of the compositions. The present invention is thus more useful in that the phosphorous-silane compounds can be added anytime during production.

In British Pat. No. 2,018,266A dated Oct. 17, 1979, there is disclosed the use of alkali metal salts of polymeric silylalkylphosphonates as metal corrosion inhibitors for alcoholic or glycolic compositions.

In Ser. No. 198,973 filed Oct. 20, 1980, now U.S. Pat. No. 4,333,843 dated June 8, 1982 there is disclosed glycol compositions which are gellation resistant due to the use of an effective amount of the hydrolyzate of compounds having the formula $$(RO)_3Si-(CH_2)_n-O-P(O)(CH_3)-OR$$

where R is an alkyl group of 1-4 carbons and n is an integer of 1-4. It is believed that these hydrolyzates are the same polymers described in the above British patent. However, the commercial use of these polymers is severely curtailed by their high cost.

U.S. Pat. No. 3,121,692 (dated Feb. 18, 1964) (Cols. 18 & 19) discloses gellation resistant glycol formulations containing sodium silicate and amino silanes. However, it has been found that the compounds used herein are much more effective than the patented amino silanes as anti-gellation additives.

The following patents show related compositions containing slioxanes and the storage stability thereof but they do not show the use of alkali metal silicates, glycol, and gellation inhibitors.

U.S. Pat. No. 3,234,144 (dated Mar. 26, 1962) Col. 12
U.S. Pat. No. 3,248,329 (dated Apr. 26, 1966) Col. 19
U.S. Pat. No. 3,312,622 (dated Apr. 4, 1967) Col. 21 & 22
U.S. Pat. No. 3,337,496 (dated Aug. 22, 1967) Col. 9
U.S. Pat. No. 3,341,469 (dated Sept. 12, 1967) Col. 9

SUMMARY OF THE INVENTION

It has now been discovered that the shelf life or gellation resistance of single phase glycol or glycol ether compositions containing alkali metal silicates can be improved by the addition to the glycol compositions of an effective amount of one of the following groups of silanes:

(I) $(RO)_{3-m}(R')_mSi-R^2-O-P(O)(OR^3)(R^4)$, (II) $[(RO)_{3-m}(R')_mSi-R^2-O-]_2P(O)(R^4)$, or 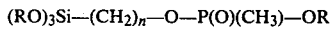
(III) mixtures of I and II,
wherein m is 0–2
$R$, $R^3$, $R^4$ are alkyl groups of 1–4 carbons,
$R'$ is an alkyl group of 1–4 carbons, phenyl, and aralkyl group of 7–10 carbons, and
$R^2$ is an alkylene group of 1–4 carbons.

Examples of compounds within the scope of I above when m is zero are methyl 3-(trimethoxysilyl) propyl methylphosphonate, butyl 2-(triethoxysilyl) ethyl methylphosphonate, propyl 3-(tripropoxysilyl) propyl methylphosphonate, and methyl 4-(trimethoxysilyl) butyl methylphosphonate.

Examples of compounds within the scope of I above when m is one are methyl 3-(methyldimethoxysilyl) propyl methyl phosphonate, methyl 3-(methyldiethoxysilyl)propyl methylphosphonate, methyl 3-(dimethoxymethylsilyl) propyl ethylphosphonate, butyl 2-(dimethoxymethylsilyl) ethyl propylphosphonate, propyl 3-(dipropoxymethylsilyl) propyl methylphosphonate, and methyl 4-(dimethoxymethylsilyl) butyl ethylphosphonate.

Examples of compounds within the scope of I above when m is two are methyl 3-(dimethylmethoxysilyl) propyl methyl phosphonate, methyl 3-(dimethylethoxy silyl) propyl methyl phosphonate, methyl 3-(methoxydimethylsilyl) propyl butylphosphonate, butyl 2-(methoxydimethylsilyl) ethyl ethylphosphonate, propyl 3-(ethoxydiethylsilyl) propyl methylphosphonate, and ethyl 4-(methoxydimethylsilyl) butyl ethyl phosphonate.

Examples of compounds within the scope of II above are bis-[3-(trimethoxysilyl)propyl] methylphosphonate, bis-[2-(trimethoxysilyl)ethyl] methylphosphonate, bis-[3-(tripropoxysilyl)propyl] methylphosphonate, bis-[4-(trimethoxysilyl)butyl] methylphosphonate, bis-[3-(methyl dimethoxysilyl)propyl] methylphosphonate, bis-[3-(methyl-diethoxy silyl) propyl] methyl phosphonate, bis-[3-(dimethylmethoxy silyl)propyl] methyl phosphonate, and bis-[3-(dimethylethoxysilyl)propyl] methyl phosphonate.

Examples of mixtures within the scope of III above are the crude reaction products produced by reacting a trialkoxysilane, a dialkoxyalkylsilane or a alkoxydialkyl silane each having an omegahaloalkylene group with a dialkyl alkylphosphonate.

These compounds can be prepared by a catalytic process as shown in U.S. Pat. No. 4,093,641 or can readily be prepared by the processes described in the above patent in Column 1. Another non-catalytic process is described below.

These anti-gellation additives are effective in the presence of the other well-known corrosion inhibitors generally present in such compositions such as alkali metal borates, mercaptobenzotriazoles, nitrates, nitrites, phosphates, benzoates and the like.

The present invention is thus a single phase composition comprising (A) 85 to 98 percent by weight of an alkylene glycol, an alkylene glycol ether, or mixtures thereof,
(B) an effective amount of an alkali metal silicate,
(C) an effective amount of one of the following:
 (I) $(RO)_{3-m}(R')_mSi-R^2-O-P(O)(OR^3)(R^4)$,
 (II) $[(RO)_{3-m}(R')_mSi-R^2-O-]_2P(O)(R4)$, or
 (III) mixtures of I and II,
 wherein m is 0-2
  R, $R^3$, $R^4$ are alkyl groups of 1-4 carbons,
  R' is an alkyl group of 1-4 carbons, phenyl, and aralkyl group of 7-10 carbons, and
  $R^2$ is an alkylene group of 1-4 carbons.

A preferred group of additive compounds are those having the formula,
 (I) $(RO)_3Si-(-CH_2)_n O-P(O)(CH_3)-OR$,
 (II) $[(RO)_3Si-(-CH_2)_n O-]_2-P(O)(CH_3)$, or
 (III) mixtures of I and II,
wherein R is an alkyl group of 1-4 carbon atoms, and n is an integer of 1-4.

DETAILED DESCRIPTION OF THE INVENTION

The glycols and glycol ethers which can be used in the present composition are (1) glycols such as ethylene glycol, diethylene glycol, propylene glycol, dipropylene glycol, (2) glycol monoethers such as the methyl, ethyl, propyl and butyl ether of ethylene glycol, diethylene glycol, propylene glycol and dipropylene glycol, and (3) glycol diethers such as the methyl and ethyl diethers of ethylene glycol, diethylene glycol, and dipropylene glycol.

Ethylene glycol, propylene glycol, and the monomethyl ether of propylene glycol, i.e., methoxypropanol are particularly preferred.

The following are examples of known corrosion inhibitors and additives which can be used in the present invention in conjunction with the above silanes.

Alkali metal silicates such as sodium metasilicate, potassium metasilicate, lithium metasilicate, and the like.

Alkali metal borates such as sodium tetraborate, potassium tetraborate, sodium metaborate, and potassium metaborate.

Alkali metal mercaptobenzothiazoles, and alkali metal tolyltriazoles.

Alkali metal nitrates such as sodium nitrate, potassium nitrate, and alkali metal nitrites such as potassium and sodium nitrite.

Alkali metal phosphates such as sodium phosphate and potassium phosphate, alkali metal benzoates, and various dyes.

In the process of making the compositions of this invention, one or more of the above glycols are mixed with one of the above non-silicate corrosion inhibitors and sufficient amounts of mercaptobenzothiazoles, tolyltriazoles, nitrates, and phosphate inhibitors necessary for corrosion protection. The pH of the solution is then adjusted to the desired pH range of 5-12, and preferably 8-11, by adding a basic inorganic compound in aqueous solution such as an alkali metal hydroxide, carbonate, or phosphate. One of the above alkali metal silicates is then added to produce a corrosion and gellation resistant glycol composition. An effective amount of one of the above silanes or mixtures thereof can be added anytime during the above process.

For the purposes of this invention, an effective amount of the above silanes which will give a gellation resistant glycol composition is an amount ranging from about 0.001 to about 5.0 percent by weight, preferably in the range from 0.002 to 0.5 percent by weight and most preferably in the range from 0.005 to 0.2 percent by weight.

The use of the above corrosion inhibitors when used in a corrosion inhibiting amount is well known in the prior art. Of course, this amount will vary for each inhibitor. In general the amounts used for the silicates and borates are 0.025 to 1.0 percent by weight based on the total solution weight of silicates and 0.1 to 2.0 percent by weight of borates. Preferably, these ranges are 0.05 to 0.50 percent for the silicates and 0.5 to 1.6 percent for the borates.

In this invention, it has been found that when the borate levels are at the higher end of the desired range (1.0 to 2.0 percent by weight), the amount of silicate that can be added must be in the lower end of the desired range of silicate level (0.025 to 0.3 percent by weight). It is not possible to set forth exactly the amount of silicate to be used in each instance due to the complicating influence of the other corrosion inhibitors such as the aforementioned triazoles, nitrates, nitrites, and phosphates. However, one can by a simple accelerated aging test determine the amount of silane which when added will give the desired gellation resistance.

An accelerated aging test was used in the examples and controls that follow to estimate the gellation resistance of the compositions. It was performed by placing a sample of the glycol composition in an oven controlled at 80°, 90°, or 95° C. and measuring the number of hours or days before the composition begins to gel.

The invention is further illustrated by the following preparation, examples, and controls which are presented to illustrate but not limit the invention.

PREPARATION 1

Into a 3 liter round bottom flask was weighed 800.0 g (4 moles), 3-chloropropyl trimethoxysilane and 1000.0 g (8 moles) dimethylmethylphosphonate. A magnetic stirrer was placed in the flask and it was fitted with a reflux condenser. The contents were heated to 187° C. over a period of 45 minutes. At this time evolution of a gas was observed by means of a mineral oil filled bubbler connected to the top of the condenser. The system was maintained at this temperature for 22.5 hours. At this time, no further gas evolution was observed through the bubbler, thus the heat was removed and the reaction mixture allowed to cool to room temperature. When cool, 1436.9 g of a pale yellow-brown liquid was recovered from the flask. Gas chromatographic analysis of this crude reaction product showed it to have the following composition: dimethyl methyl phosphonate, 44.4%; methyl 3-(trimethoxysilyl)propyl methyl phosphonate, 39.6%; bis-[3-trimethoxysilyl) propyl]methyl phosphonate, 7.2%. Two other small unidentified peaks were observed. One coming before dimethyl methyl phosphonate and the other coming after bis-[3-(trimethoxysilyl)propyl]methyl phosphonate. A porton of this sample was distilled in vacuo at about 2 mm Hg pressure. Unreacted dimethylmethylphosphonate was recovered as the fraction boiling at about 30°–50° C. The fraction boiling at 112°–114° C. as identified as methyl 3-(trimethoxysilyl) propyl methylphosphonate, which has the formula

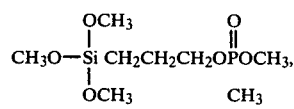

by gas chromatography, NMR and mass spectrometry. Gas chromatographic analysis of the fraction boiling at about 160°–200° C. showed it to be mainly bis-[3-(trimethoxysilyl)propyl] methyl phosphonate

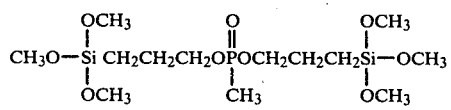

by comparison to a standard sample prepared by the method described in U.S. Pat. No. 4,093,641.

EXAMPLES 1-8

Into 917.0 g ethylene glycol was added 52.0 g of a 25% by weight sodium metaborate pentahydrate solution in ethylene glycol. A 33⅓% aqueous sodium nitrate solution (6.0 g) was added and stirred until well dissolved, followed by 2.0 g of a 50% aqueous solution of sodium tolyltriazole. The pH of the solution was then adjusted to 8.4–8.5 with a 10% aqueous caustic solution. Aqueous sodium metasilicate pentahydrate (3.0 g in 10.0 g water) was added to the mixture. The gel stability of this solution at 80° C. and 90° C. as well as those to which various stablizing agents were added are presented in Table I wherein the time in days is the amount of time before the first visible formation of a gel was observed.

TABLE I

| Example | Stabilizer | (%) | Stability (days) 80° C. | 90° C. |
|---|---|---|---|---|
| Control | none | — | 0.8 | 0.5 |
| 1. | (CH$_3$O)$_3$Si(CH$_2$)$_3$OPOCH$_3$ / CH$_3$ (P=O) | 0.003 | 3 | 1.7 |
| 2. | (CH$_3$O)$_3$Si(CH$_2$)$_3$OPOCH$_3$ / CH$_3$ (P=O) | 0.02 | 8 | 5 |
| 3. | (CH$_3$O)$_3$Si(CH$_2$)$_3$OPOCH$_3$ / CH$_3$ (P=O) | 0.2 | >30 | >30 |

TABLE I-continued

| Example | Stabilizer | (%) | Stability (days) 80° C. | 90° C. |
|---|---|---|---|---|
| 4. | [(CH$_3$O)$_3$Si(CH$_2$)$_3$O]$_2$PCH$_3$ (P=O) | 0.002 | 4 | 1.7 |
| 5. | [(CH$_3$O)$_3$Si(CH$_2$)$_3$O]$_2$PCH$_3$ (P=O) | 0.02 | 9 | >30 |
| 6. | [(CH$_3$O)$_3$Si(CH$_2$)$_3$O]$_2$PCH$_3$ (P=O) | 0.2 | >30 | >30 |
| 7. | Crude mixture of Example 1 | 0.02 | 3 | 1.7 |
| 8. | Crude mixture of Example 1 | 2 | >30 | >30 |

From a consideration of the data presented in Table I, it is evident that amounts of methyl 3-(trimethoxysilyl) propyl methylphosphonate and bis-[3-(trimethoxysilyl)-propyl] methyl phosphonate as low as 30 and 20 ppm are effective additives to increase the gel stability over the control. While not as effective as the above pure silanes, the crude reaction mixture is also effective as a gel inhibitor.

EXAMPLES 9-13

These examples demonstrate the utility of these phosphorous-modified silanes by showing their effectiveness even when added after the silicate and other corrosion inhibitors. Five samples of a commercial silicate containing antifreeze were evaluated for stability at 95° C. To each lot was added 0.02% of the crude reaction mixture described in preparation 1. The stability of these samples were also measured under identical conditions. These data are presented in Table II.

TABLE II

| Example | Antifreeze Lot | Gel Time 95° C. (days) Control | Control Plus Stabilizer* |
|---|---|---|---|
| 9 | A | 1 | 4.7 |
| 10 | B | 0.7 | 4.1 |
| 11 | C | 0.7 | 2.8 |
| 12 | D | 1 | 5.7 |
| 13 | E | 1 | 4.7 |

*Control plus 0.02% by weight of the crude reaction product of preparation #1.

EXAMPLES 14-18

A particular lot of a commercial antifreeze was found to have an oven stability at 95° C. of 6 hours. Addition of small amounts of methyl 3-(trimethylsilyl) propyl methylphosphonate to this unstable coolant was found to greatly increase the time required for gel formation under these conditions. These data are presented in Table III.

TABLE III

| Examples | Methyl 3-(trimethylsilyl)propyl methylphosphonate (ppm) | Gel Time @ 95° C. (days) |
|---|---|---|
| Control | 0 | 0.25 |
| 14 | 20 | 2 |
| 15 | 50 | 2 |
| 16 | 100 | 2 |
| 17 | 200 | 10 |
| 18 | 1000 | 14 |

EXAMPLES 19 AND 20

The procedure in the preceding Examples was repeated with the only change being in the stabilizer which was added to the commercial antifreeze. It was found in Example 19 that the addition of 200 ppm bis-[3-(trimethoxysilyl) propyl] methylphosphonate increased the gel time from 6 hours to 6 days. In Example 20, it was found that 1000 ppm resulted in a gel time of 14 days.

EXAMPLES 21 AND 22

Into 917.0 g ethylene glycol was added 52.0 g of a 25% by weight sodium metaborate pentahydrate solution in ethylene glycol. A 33⅓% aqueous sodium nitrate solution (6.0 g) was added and stirred until well dissolved, followed by 2.0 g of a 50% aqueous solution of sodium tolyltriazole. The pH of the solution was then adjusted to 5.8–5.9 with 25% aqueous caustic solution. Sodium metasilicate pentahydrate was dissolved in 20.0 g water and added to the mixture with stirring to give two levels of silicate. The stability of these solutions at 80° C. and 90° C. as well as those of similar solutions stabilized by the addition of 0.1% or 1000 ppm of methyl 3-(trimethoxysilyl) propyl methylphosphonate are presented in Table IV.

TABLE IV

| Example | $Na_2SiO_3.5H_2O$ (%) | Gel Time (days) 80° C. | 90° C. |
|---|---|---|---|
| (Control A) | 0.5 | 2 | 1 |
| 21 (Stabilized A) | 0.5 | >24 | >24 |
| (Control B) | 0.7 | 1 | 1 |
| 22 (Stabilized B) | 0.7 | 3 | 3 |

The above data indicates that while higher levels of sodium silicate (7000 ppm) have a short gel time, they can be improved by the use of the silanes of this invention. With lower levels of silicate (5000 ppm) the silanes of this invention vastly increase the gel time.

EXAMPLES 23 AND 24

To samples of a commercial antifreeze containing silicates was added sufficient amounts of different stabilizers to yield a 50 ppm solution. The time required for the formation of a visible silica gel in these solutions was determined at 90°–95° C. Average gel times, three determinations each, are presented in Table VI.

TABLE VI

| Example | Stabilizer | Gel Time at 90-95° C. (hrs) |
|---|---|---|
| Control A | none | 3.0 |
| Control B | Na salt phosphonate functional siliconate (British 2,018,266A) | 7.0 |
| Control C | 3-aminopropyltrimethoxy silane (U.S. Pat. No. 3,121,692) | 3.0 |
| 23 | methyl 3-(trimethoxy silyl) propyl methyl phosphonate | 7.7 |
| 24 | bis-[3-(trimethoxysilyl) propyl]methy phosphonate | 8.0 |

I claim:

1. A gellation resistant glycol composition comprising
   (A) 85 to 98 percent by weight of an alkylene glycol, an alkylene glycol ether, or mixtures thereof,
   (B) an effective amount to reduce corrosion of an alkali metal silicate,
   (C) an effective amount of one of the following:
      (I) $(RO)_{3-m}(R')_mSi-R^2-O-P(O)(OR^3)(OR^3)(R^4)$,
      (II) $[(RO)_{3-m}(R')_mSi-R^2-O-]_2P(O)(R4)$
      (III) mixtures of I and II,
      wherein m is 0–2
      R, $R^3$, $R^4$ are alkyl groups of 1–4 carbons,
      R' is an alkyl group of 1–4 carbons, phenyl, and aralkyl group of 7–10 carbons, and
      $R^2$ is an alkylene group of 1–4 carbons.

2. The composition of claim 1 wherein the alkylene glycol is ethylene glycol.

3. The composition of claim 1 wherein the alkylene glycol is propylene glycol.

4. The composition of claim 1 wherein the alkylene glycol is the monomethyl ether of propylene glycol.

5. A gellation resistant glycol composition comprising
   (A) 85 to 98 percent by weight of an alkylene glycol,
   (B) an effective amount to reduce corrosion of an alkali metal borate,
   (C) an effective amount to reduce corrosion of an alkali metal silicate,
   (D) an effective amount of one of the following:
      (I) $(RO)_{3-m}(R')_mSi-R^2-O-P(O)(OR^3)(R^4)$,
      (II) $[(RO)_{3-m}(R')_mSi-R^2-O-]_2P(O)(R4)$, or
      (III) mixtures of I and II,
      wherein m is 0–2
      R, $R^3$, $R^4$ are alkyl groups of 1–4 carbons,
      R' is an alkyl group of 1–4 carbons, phenyl, and aralkyl group of 7–10 carbons, and
      $R^2$ is an alkylene group of 1–4 carbons.

6. The composition of claim 5 wherein the alkylene glycol is ethylene glycol.

7. The composition of claim 5 wherein the alkylene glycol is propylene glycol.

8. The composition of claim 5 wherein R is a methyl group and m is zero.

9. A corrosion and gellation resistant glycol composition comprising
   (A) 85 to 98 percent by weight of an alkylene glycol,
   (B) 0.1 to 2.0 percent by weight of an alkali metal borate
   (C) 0.025 to 1.0 percent by weight of an alkali metal silicate,
   (D) an effective amount of one of the following silanes:
      (I) $(RO)_{3-m}(R')_mSi-R^2-O-P(O)(OR^3)(R^4)$,
      (II) $[(RO)_{3-m}(R')_mSi-R^2-O-]_2P(O)(R4)$, or
      (III) mixtures of I and II,
      wherein m is 0–2
      R, $R^3$, $R^4$ are alkyl groups of 1–4 carbons,
      R' is an alkyl group of 1–4 carbons, phenyl, and aralkyl group of 7–10 carbons, and
      $R^2$ is an alkylene group of 1–4 carbons.

10. The composition of claim 9 wherein the amount of said silane used is 0.001 to 5.0 percent by weight.

11. The composition of claim 9 wherein the amount of said silane used is 0.002 to 0.5 percent by weight.

12. The composition of claim 9 wherein R is a methyl group and m is zero.

13. A method for making gellation resistant glycol compositions containing alkali metal silicates; and other corrosion inhibitors which comprises adding to the glycol compositions an effective amount to improve gellation resistance of the compounds having the formulas,
   (I) $(RO)_{3-m}(R')_mSi-R^2-O-P(O)(OR^3)(R^4)$, (II) [(RO)$_{3-m}$(R')$_m$Si—R$^2$—O—]$_2$P(O)(R4), or
(III) mixtures of I and II,
wherein m is 0–2
  R, R$^3$, R$^4$ are alkyl groups of 1–4 carbons,
  R' is an alkyl group of 1–4 carbons, phenyl, and aralkyl group of 7–10 carbons, and
  R$^2$ is an alkylene group of 1–4 carbons.

14. The method as set forth in claim 13 wherein R is a methyl group and m is zero.

15. The method as set forth in claim 13 wherein the alkylene glycol is ethylene glycol.

16. The product produced by the method of claim 13.

17. The product produced by the method of claim 14.

18. The product produced by the method of claim 15.

19. A gellation resistant glycol composition comprising
  (A) 85 to 98 percent by weight of an alkylene glycol, an alkylene glycol ether, or mixtures thereof,
  (B) an effective amount to reduce corrosion of an alkali metal silicate,
  (C) an effective amount of one of the following:
    (I)  (RO)$_3$Si—(CH$_2$)$_n$O-P(O)(CH$_3$)—OR,
    (II) [(RO)$_3$Si—(CH$_2$)$_n$O—]$_2$—P(O)(CH$_3$), or
    (III) mixtures of I and II,
wherein R is an alkyl group of 1–4 carbon atoms, and n is an integer of 1–4.

20. The composition of claim 19 wherein the alkylene glycol is ethylene glycol.

21. The composition of claim 19 wherein the alkylene glycol ether is the monomethyl ether of propylene glycol.

22. The composition of claim 19 wherein R is a methyl group and n is 3.

23. A corrosion and gellation resistant glycol composition comprising
  (A) 85 to 98 percent by weight of an alkylene glycol,
  (B) 0.1 to 2.0 percent by weight of an alkali metal borate
  (C) 0.025 to 1.0 percent by weight of an alkali metal silicate,
  (D) an effective amount of one of the following silanes:
    (I)  (RO)$_3$Si—(CH$_2$)$_n$O-P(O)(CH$_3$)—OR,
    (II) [(RO)$_3$Si—(CH$_2$)$_n$O—]$_2$—P(O)(CH$_3$), or
    (III) mixtures of I and II,
wherein R is an alkyl group of 1–4 carbon atoms, and n is an integer of 1–4.

24. The composition of claim 23 wherein the amount of said silane used is 0.001 to 5.0 percent by weight.

25. The composition of claim 23 wherein the amount of said silane used is 0.002 to 0.5 percent by weight.

26. The composition of claim 23 wherein R is a methyl group and n is 3.

27. The composition of claim 23 wherein the alkylene glycol is ethylene glycol.

28. A method for making a gellation resistant glycol composition containing alkali metal silicates, and other corrosion inhibitors which comprises adding to the glycol compositions before or during the addition of the alkali metal silicates an effective amount to improve gellation resistance of the compounds having the formulas,
    (I)  (RO)$_3$Si—(CH$_2$)$_n$O-P(O)(CH$_3$)—OR,
    (II) [(RO)$_3$Si—(CH$_2$)$_n$O]$_2$—P(O)(CH$_3$), or
    (III) mixtures of I and II,
wherein R is an alkyl group of 1–4 carbon atoms, and n is an integer of 1–4.

29. The method as set forth in claim 28 wherein R is a methyl group and n is 3.

30. The method as set forth in claim 28 wherein the alkylene glycol is ethylene glycol.

31. The product produced by the method of claim 28.

32. The product produced by the method of claim 29.

33. The product produced by the method of claim 30.

* * * * *

UNITED STATES PATENT AND TRADEMARK OFFICE
CERTIFICATE OF CORRECTION

PATENT NO. : 4,367,154
DATED : January 4, 1983
INVENTOR(S) : Robert T. Jernigan

It is certified that error appears in the above—identified patent and that said Letters Patent is hereby corrected as shown below:

Col. 2, line 6; "slioxanes" should read --siloxanes--.
Col. 5, line 5; "porton" should read --portion--.
Col. 5, line 9; the first "as" should be --was--.
Col. 5, line 43; "stablizing" should read --stabilizing--.
Col. 7, Table VI, line 60; "propyl]methy" should read --propyl]methyl--.
Col. 8, Claim 1, line 2; delete one of the $(OR^3)$.
Col. 8, Claim 1, line 4; add the word --or-- after (R4).
Col. 8, Claim 13, line 2; change the semi-colon ";" after the word silicates to a comma --,--.

Signed and Sealed this

Second Day of August 1983

[SEAL]

Attest:

GERALD J. MOSSINGHOFF

Attesting Officer  Commissioner of Patents and Trademarks